(12) United States Patent
Ellis

(10) Patent No.: US 11,423,272 B2
(45) Date of Patent: Aug. 23, 2022

(54) METHOD OF FORMING A FABRIC CONTAINING A FUNCTIONAL CODE PATTERN

(71) Applicant: Inman Mills, Inman, SC (US)

(72) Inventor: Thomas M. Ellis, Seneca, SC (US)

(73) Assignee: Inman Mills, Inman, SC (US)

( * ) Notice: Subject to any disclaimer, the term of this patent is extended or adjusted under 35 U.S.C. 154(b) by 323 days.

(21) Appl. No.: 16/620,635

(22) PCT Filed: Jun. 12, 2018

(86) PCT No.: PCT/US2018/037050
§ 371 (c)(1),
(2) Date: Dec. 9, 2019

(87) PCT Pub. No.: WO2018/231789
PCT Pub. Date: Dec. 20, 2018

(65) Prior Publication Data
US 2020/0193251 A1 Jun. 18, 2020

Related U.S. Application Data

(60) Provisional application No. 62/520,654, filed on Jun. 16, 2017.

(51) Int. Cl.
*G06K 19/06* (2006.01)
*D03D 1/00* (2006.01)
(Continued)

(52) U.S. Cl.
CPC ..... *G06K 19/06028* (2013.01); *D03D 1/0011* (2013.01); *D03D 15/43* (2021.01);
(Continued)

(58) Field of Classification Search
None
See application file for complete search history.

(56) References Cited

U.S. PATENT DOCUMENTS

| 4,766,301 A | 8/1988 | Evers |
| 2003/0089782 A1* | 5/2003 | Reed ........................ D06H 1/00 235/468 |

(Continued)

OTHER PUBLICATIONS

International Search Report and Written Opinion for PCT/US2018/037050, dated Sep. 12, 2018, 13 pages.

*Primary Examiner* — Kristy A Haupt
(74) *Attorney, Agent, or Firm* — Dority & Manning, P.A.

(57) ABSTRACT

A method of producing a textile product wherein a functional code pattern is structurally embedded within a textile product as the textile yarns are interlaced to become a textile product is provided. The functional code pattern is embedded within the textile product by programming a textile process machine with conversion factors and mathematical ratios, producing an enlarged code pattern that adheres to the customary rules of public or proprietary barcode formatting. Alternatively, the functional code pattern can be digitally printed onto the textile. The resulting textile product includes a functional and decorative code pattern that is readable by a standard electronic code reading device. Depending upon the type of textile yarn materials used, the code pattern created in or printed on the textile fabric may or may not be visible to the human eye.

19 Claims, 5 Drawing Sheets

(51) Int. Cl.
*D03D 15/43* (2021.01)
*D03D 15/54* (2021.01)
*G06K 19/02* (2006.01)
*D04B 1/12* (2006.01)
*D04B 21/08* (2006.01)
*D06P 5/30* (2006.01)
*G05B 19/4097* (2006.01)

(52) U.S. Cl.
CPC ............ *D03D 15/54* (2021.01); *D04B 1/126* (2013.01); *D04B 21/08* (2013.01); *D06P 5/30* (2013.01); *G05B 19/4097* (2013.01); *G06K 19/027* (2013.01); *G06K 19/06046* (2013.01)

(56) References Cited

U.S. PATENT DOCUMENTS

| | | | |
|---|---|---|---|
| 2006/0247819 A1* | 11/2006 | Speich | D03D 1/0011 700/130 |
| 2015/0326892 A1* | 11/2015 | McCoy | H04N 21/23418 725/34 |
| 2017/0037546 A1 | 2/2017 | Lau et al. | |
| 2017/0198424 A1* | 7/2017 | Alex | D03D 47/34 |

\* cited by examiner

METHOD OF FORMING A FABRIC CONTAINING A FUNCTIONAL CODE PATTERN

RELATED APPLICATION

The present application is the national stage entry of International Patent Application No. PCT/US2018/037050, having a filing date of Jun. 12, 2018, which claims priority to U.S. Provisional Application Ser. No. 62/520,654, filed on Jun. 16, 2017, both of which are incorporated herein in their entirety by reference thereto.

BACKGROUND OF THE INVENTION

A barcode is an automatic identification technology that is used for product identification. Barcodes were originally designed for use in labels that were attached to a product. Barcodes are typically a graphic representation of data that is readable by an electronic machine or barcode reading device. Traditional barcodes are expressed in various formats such as Code 39 and Code 128, which reside in the public sector. Regardless of the code format used, barcode systems employ a series of bars that are printed or formed in very precise widths. A barcode reading device can measure the width of the bars, and then convert those signals into the intended numerals, letters, or characters.

When textile products include barcodes, typically, the barcodes are small and attached in hidden areas of the textile product. The barcode material is manufactured in a process that is separate and independent of the final textile product to which it will be attached. The general objective is to make the textile barcode hidden from public view. To achieve this objective, a standard barcode is produced on the scale of inches and is void of colors other than black and white such that it provides no aesthetic value to the end product. Thus, the barcode is solely used as a functional means of product identification and data collection.

With the increasing popularity of social media applications, a method of making a textile product that includes a unique fabric in the form of a barcode, where the barcode does not look like a traditional bar code, and where the barcode is integral to the fabric and becomes a part of a garment or other product formed from the fabric would be useful.

SUMMARY OF THE INVENTION

The present invention relates to a method of producing a textile product in which a decorative and distinctive code pattern is visibly or invisibly embedded within or printed on the textile product. Further, the present application is directed to a method of mass producing textile products incorporated with such code patterns, wherein a functional and/or aesthetic code pattern can be automatically assigned to a section of the textile product as desired.

In one particular embodiment, a method of producing a textile fabric comprising a functional code pattern embedded therein is contemplated. The method includes calculating conversion factors to allow the textile fabric to adhere to standard barcode formatting rules to transfer to the functional code pattern embedded within the textile product; calculating mathematical ratios between dimensions of a standard barcode label and desired dimensions for the functional code pattern embedded within the textile product, wherein the functional code pattern is enlarged compared to the standard barcode label; programming a textile process machine with the calculated conversion factors and mathematical ratios, wherein the programming controls bar width, bar spacing, bar color, or a combination thereof of the functional code pattern; and simultaneously incorporating the functional code pattern into the textile fabric and interlacing a plurality of textile yarns to form the textile fabric.

In another embodiment, the method can include mass producing the textile fabric by simultaneously incorporating a plurality of functional code patterns into the textile fabric, where the method of mass producing the textile fabric is a continuous process.

In still another embodiment, the textile process machine can include a weaving machine or a knitting machine.

In yet another embodiment, the functional code pattern is woven or knitted into the textile fabric.

In one more embodiment, the functional code pattern can span across a visible portion of the textile fabric.

In an additional embodiment, the plurality of textile yarns can be of varying diameters. Further, the textile process machine can be programmed with determined correction factors prior to manufacture to compensate for differences in the varying diameters of the plurality of textile yarns.

In another embodiment, the plurality of textile yarns can have a consistent diameter.

In still another embodiment, the textile fabric can include a plurality of segments, wherein the textile process machine can be programmed to produce a unique functional code pattern for each of the plurality of segments.

In yet another embodiment, the textile fabric can include a plurality of segments, wherein the textile process machine can be programmed to produce identical functional code patterns for each of the plurality of segments.

In one more embodiment, the textile fabric can include a single textile base material comprising a plurality of unique functional code patterns.

In an additional embodiment, the textile fabric can include a single textile base material comprising a plurality of identical functional code patterns.

In another particular embodiment, a method of producing a textile fabric comprising a functional code pattern digitally printed thereon is contemplated. The method includes calculating conversion factors to allow a digitally printed fabric to adhere to standard barcode formatting rules to transfer to the functional code pattern printed on the textile product; calculating mathematical ratios between dimensions of a standard barcode label and desired dimensions for the functional code pattern printed on the textile product, wherein the functional code pattern is enlarged compared to the standard barcode label; programming a textile process machine with the calculated conversion factors and mathematical ratios, wherein the programming controls bar width, bar spacing, bar color, or a combination thereof of the functional code pattern; and incorporating the functional code pattern onto the textile fabric via printing.

In another embodiment, the method can include mass producing the textile fabric by simultaneously incorporating a plurality of functional code patterns onto the textile fabric via printing, wherein the method of mass producing the textile fabric is a continuous process.

In one embodiment, the functional code pattern can span across a visible portion of the textile fabric.

In still another embodiment, the textile fabric can include a plurality of segments, wherein the textile process machine is programmed to produce a unique code pattern for each of the plurality of segments.

In yet another embodiment, the textile process machine can be programmed to produce identical code patterns for each of the plurality of segments.

In one more embodiment, the functional code pattern can be read by an electronic code reading device.

In an additional embodiment, the functional code pattern produced can be in the form of any pattern. For instance, the functional code pattern can include horizontal stripes, vertical stripes, or a plaid pattern. Further, the functional code pattern can include a Code 39 barcode or a Code 128 barcode.

In another embodiment, the functional code pattern can include a horizontal barcode component and a vertical barcode component.

In still another embodiment, the functional code pattern can be decorative and visible to the human eye.

In yet another embodiment, the functional code pattern can be invisible to the human eye.

In another particular embodiment, a textile fabric formed according to the method described herein is contemplated, where the textile fabric is constructed into any textile product composed of textile material. Further, the textile product can include a garment, a backpack, a fabric, or a blanket.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, including reference to the appended figures in which.

DETAILED DESCRIPTION

Figure 1:
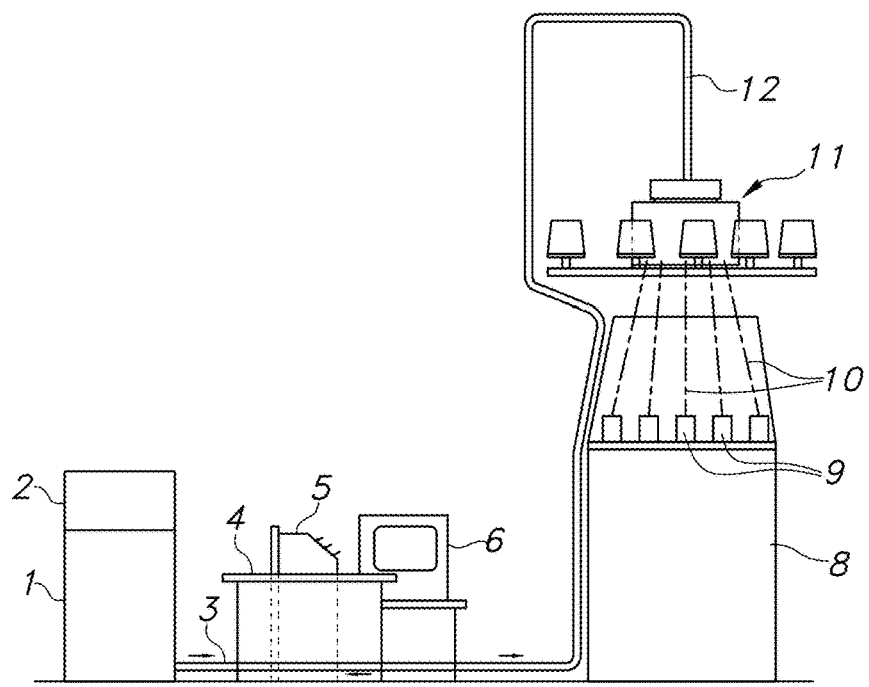
FIG. 1 is a diagrammatic view of a typical computer and pattern preparation apparatus coupled to a knitting machine.

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. For the purposes of this application, like features will be represented by like numbers between the figures.

Generally speaking, in one particular embodiment, the present disclosure is directed to a textile product as well as a method of producing the textile product where a code pattern is structurally embedded within the textile product at the instant the textile yarns are interlaced to become a textile product resulting in a visible (or invisible) and aesthetically pleasing code pattern on the exterior of a textile product that is functional through the use of a code reader or electronic device. Alternatively, in another embodiment, the code pattern can be digitally printed on a textile fabric after the fabric has been manufactured or on a textile product after the product has been manufactured. As mentioned above, barcodes were originally designed for use in labels that were attached to a product. In contrast, the present invention contemplates textile garments or products that include barcodes not as an attached label or attached component, but rather as an integral part of the textile garment or product. In other words, the barcode becomes part of the garment or product as part of the manufacturing process.

Coded fabrics described herein may contain readable bars in the width direction only, the length direction only, or a combination of both (as a plaid type pattern). Various colors may be employed in the bars of such readable coded fabrics, for aesthetic enhancement.

As contemplated by the present invention, the textile product with a uniform or continuous pattern in which the pattern embedded within the textile product can be readable by an electronic code reading device. In this sense, the code pattern can contain any desired information, including information about the owner, product brand, maker, or the like. Subsequently, an electronic code reading device can be used to easily read the information incorporated into the textile product, potentially providing an efficient and cost-effective method of product identification or providing any desired information about the product's owner or user. Alternatively, a textile product produced with a uniform or continuous pattern in which the pattern is digitally printed onto the textile product is also contemplated by the present invention.

As mentioned above, traditional barcodes are typically used purely as a means of product identification. However, the present invention contemplates expanding a barcode's role by creating a method of producing a decorative pattern that continues to perform barcode functions. Also, a textile product embedded or printed with a decorative and functional code pattern that is not perceived as a barcode can be used in a recreational manner, as the code pattern can initiate a personalized response from an electronic code reading device or create a direct link to and reaction from various forms of social media.

Further, the present invention contemplates a method in which multiple yarns of varying diameters can be used to produce a textile fabric embedded with a functional code pattern. Traditionally, only yarns of uniform diameters could be used to produce a woven barcode, as multiple yarns of differing diameters would cause the bar width and bar spacing of the code pattern to be disrupted, and thus unreadable by an electronic device. By resolving this need, the opportunities for variety in the produced textile products expands, as yarns of different colors and sizes can be used to create a textile product with a code pattern that is aesthetically pleasing as well as functional. Also, textile yarns are available that are reactive to electronic reading devices but that are not visible to the human eye. Therefore, it can be accomplished that the aforementioned code patterns can be incorporated into the textile product and can be invisible to the human eye, yet can remain detectable and readable by an electronic device.

Coding technology based on the binary structure of a woven material can produce a code pattern that is structurally part of a textile product or that can be digitally printed onto a textile product and can be both functional and fashionable. This technology can be viewed as a blend of textile and coding technology in which fabrics and garments are incorporated or printed with a coding function. Thus, a barcode-like code pattern can be embedded within a generic textile product or printed directly thereon, producing a textile product that continues to be aesthetically pleasing to consumers but also functional through the use of an electronic code reading device.

An electronic device that is capable of reading the textile code pattern is critical to the functionality of the produced textile product. These commercially available electronic devices consist of an illumination system, sensor, and decoder. The identification of a textile code pattern is generally based on image analysis and pattern recognition. Currently, multiple electronic devices exist to perform the function of reading a code pattern and initiating the programmed response, including smartphone devices.

The present application relates to a method of producing a textile product in which a functional and decorative code pattern is visibly or invisibly embedded within or alternatively digitally printed on a textile product. Using an electronic device capable of reading such code patterns, the code pattern on the textile product can trigger a unique and desired response from the electronic device.

Specifically, the method of creating a textile product that incorporates a functional code pattern at the time period in which the textile product is manufactured requires programming a textile process machine to effectively control bar width, bar spacing, and bar color of the code pattern produced. This method requires calculating the conversion factors that allow a textile material to adhere to barcode protocol rules from the public domain and the mathematical ratio between the standard dimensions of a barcode label and the desired dimensions of an enlarged code pattern that will appear on the textile product. Subsequently, the appropriate conversion factors and mathematical ratios can be programmed into a textile process machine, resulting in an enlarged code pattern embedded within a textile product. While typical barcodes are produced using an inches scale, the present application relates to code patterns produced using a feet or yard scale. The enlarged functional code pattern produced using this method continues to follow the customary rules of bar width and bar spacing of a standard sized barcode; thus, the enlarged code pattern structurally embedded within the textile product continues to be functional by an electronic code reading device.

In one embodiment, a knitting machine can produce a textile product embedded with a functional code pattern through programming comprising a computer controlled mechanism. FIG. 1 shows diagrammatically a knitting machine 8 associated with a computer 2 through an interface 1. For pattern recognition there is also a digitizing table 4, a keyboard 5, and a visual display unit 6. A composite cable 3 is housed within a conduit tube 12. The conduit tube 12 is used to connect the coupler unit 11 to the computer interface 1 as shown in FIG. 1. Further, the composite cable 3 is used to transmit pattern data from the computer to the coupling unit 11. The composite cable 3 also transmits timing signals from the computer 2 to the coupler unit 11. Thus, the pattern data signals and timing signals can work together to produce patterning impulses to the patterning units 9 via the coupler unit 11, resulting in the ability to knit a textile product that incorporates a functional code pattern made of textile yarn 10. This code pattern can be altered on demand through programming the computer 2 as desired, such that each final textile product contains the desired functional code pattern. In some embodiments, the programming results in identical code patterns produced on the textile products. In some embodiments, the programming results in a plurality of unique code patterns produced on the textile products.

Figure 2:
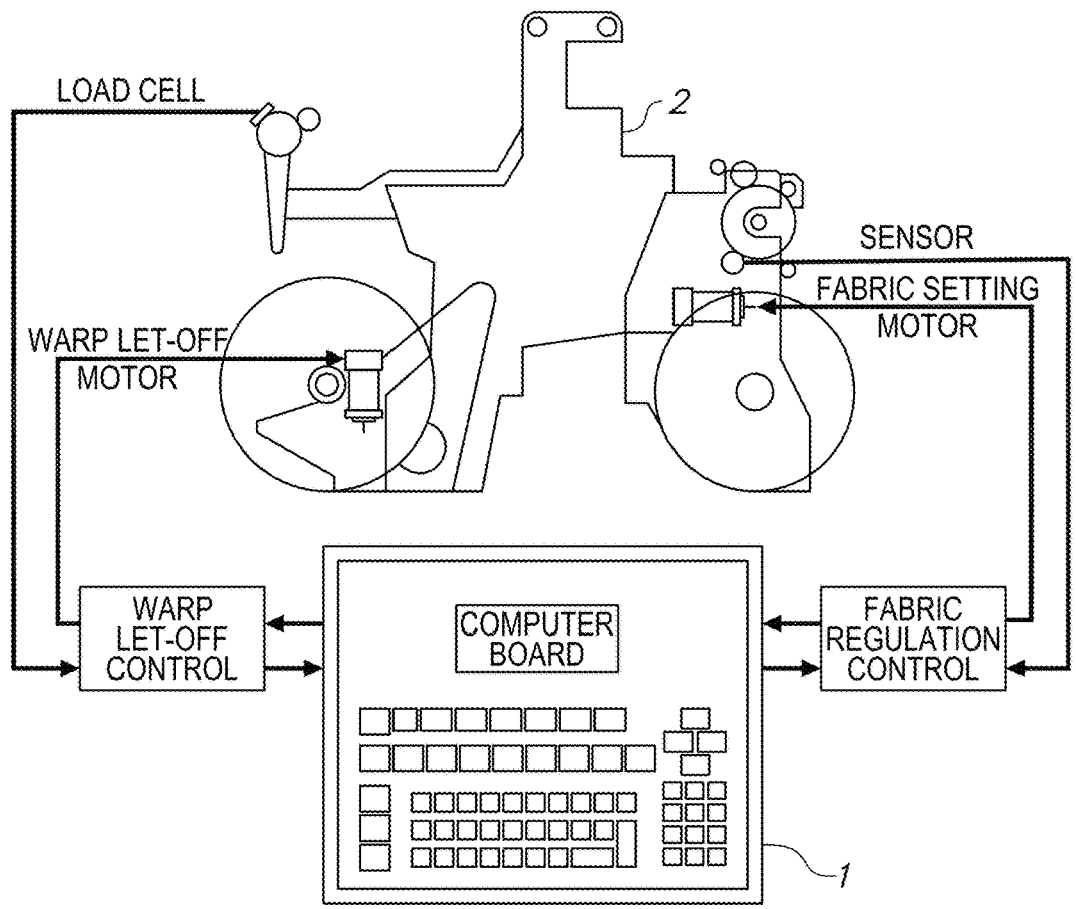
FIG. 2 is a diagrammatic view of a typical computer and pattern preparation apparatus coupled to a weaving machine.

Similarly, in one embodiment, a weaving machine can produce a textile product embedded with a functional code pattern through programming comprising a computer controlled mechanism. FIG. 2 diagrammatically shows the same disclosed method when associated with a weaving machine. A computer board 1 is used to electronically configure the desired parameter values, including warp-let off and fabric density. These parameter values are then able to be transmitted to the weaving machine 2, resulting in a textile product embedded with a functional code pattern. This code pattern can be altered on demand through programming the computer board 1 as desired, such that each final textile product contains the desired functional code pattern. In some embodiments, the programming results in identical code patterns produced on the textile products. In some embodiments, the programming results in a plurality of unique code patterns produced on the textile products, such that each individual final textile product contains its own unique built in functional code.

Figure 5:
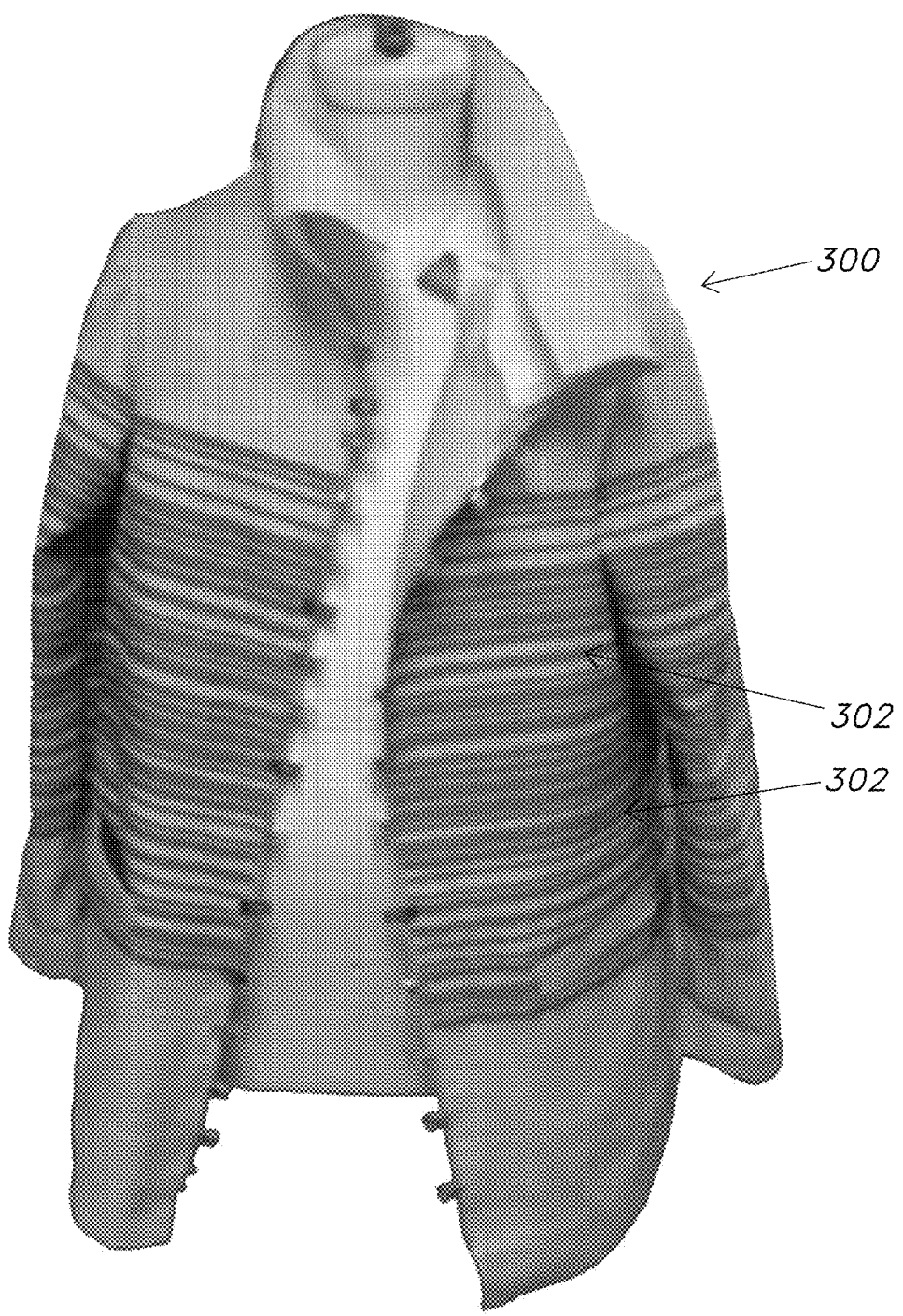
FIG. 5 shows an example of a coat garment embedded or digitally printed with a functional and readable code pattern indicated by the horizontal, striped pattern on the exterior of the coat.

The present application discloses functional code patterns created using standard public domain formats for bar spacing, width, and color, including Code 39 and Code 128. In one embodiment, proprietary barcode formats, distinct from the public domain formats, can be used to produce functional and readable code patterns embedded within or digitally printed on a textile fabric or a textile product. For example, a functional code pattern in both the horizontal and vertical direction, resulting in a plaid effect, can be incorporated into or printed on textile fabrics or textile products using the method disclosed. Despite the non-standard code pattern, the proprietary formats retain complete functionality when incorporated into a textile product and can be read via an electronic code reading device. In FIG. 5 a fabric depicting a proprietary code format through an aesthetic plaid pattern is illustrated.

The present invention is also directed towards a method in which each textile product has an embedded code pattern. In some embodiments, each textile product is created using a unique code pattern, resulting in each textile product being capable of producing a different response by an electronic code reading device. Given that a textile product can have its own unique code pattern, the individual owner of the textile article has the ability to program his or her own desired personalized response when the code pattern is read by an electronic code reading device. In other embodiments, the same code pattern can be incorporated into the textile product through the method disclosed, including mass production of many textile products via the method disclosed. When identical code patterns are embedded within textile products, each identical code pattern will trigger the same response when an electronic code reading device is used to read the code pattern incorporated in the textile product.

The present application is further directed to textiles containing code patterns that initiate a reaction when read by an electronic reading device. Generally, an electronic reading device for barcode-like patterns involves a device that analyzes a code pattern's image data and subsequently sends the code pattern's content to an output port. The present application discloses that any electronic code reading device can be used to read the code patterns incorporated within the textile product. In some embodiments, a smartphone device can act as the electronic code reading device. Through the smartphone itself or through smartphone applications, an owner of a textile product embedded with a code pattern or printed with a code pattern can use his or her smartphone device as a barcode reader and initiate the programed response from the code pattern embedded within the textile product or printed on the textile product.

The present application additionally discloses the method of forming code patterns incorporated into textile products through mass production of such textile products. This method comprises programming a textile process machine to effectively control bar width, bar spacing, and bar color of the code pattern produced. Thus, this method requires calculating the conversion factors that allow a textile material to adhere to barcode protocol rules from the public domain and the mathematical ratio between the standard dimensions of a barcode label and the desired dimensions of an enlarged code pattern that will appear on the textile product. Subsequently, the appropriate conversion factors and mathematical ratios can be programmed into a textile process machine, resulting in an enlarged code pattern embedded within a textile product. In particular, using this mass production method, a functional and/or aesthetic code pattern can be assigned to a desired section of a textile fabric automatically and continuously through programming the textile process machine. Thus, the functioning code pattern can be incorporated into textile products much like an individual serial number. Further, using the mass production method disclosed, the textile process machine can be programmed to produce a textile product that comprises a plurality of functional code patterns, where the process is continuous and does not require stopping the machine to adjust for different functional code patterns.

Figure 6:
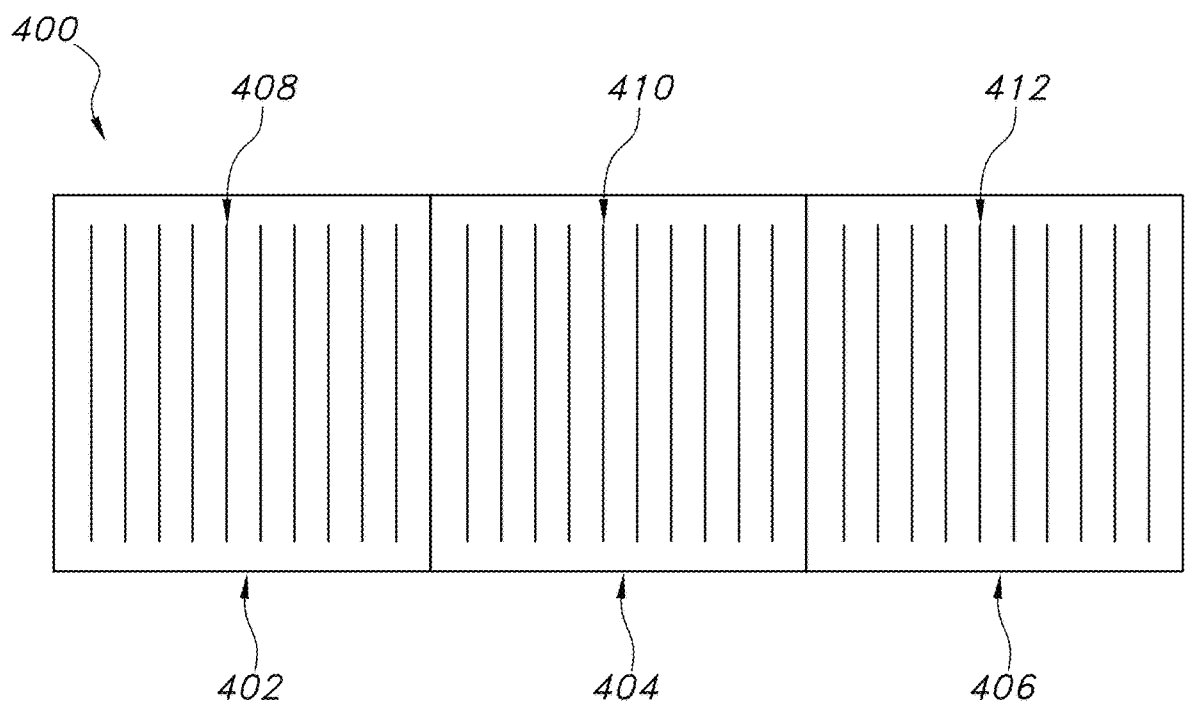
FIG. 6 shows a textile fabric comprising three segments, wherein the three segments are incorporated with identical code patterns.
Figure 7:
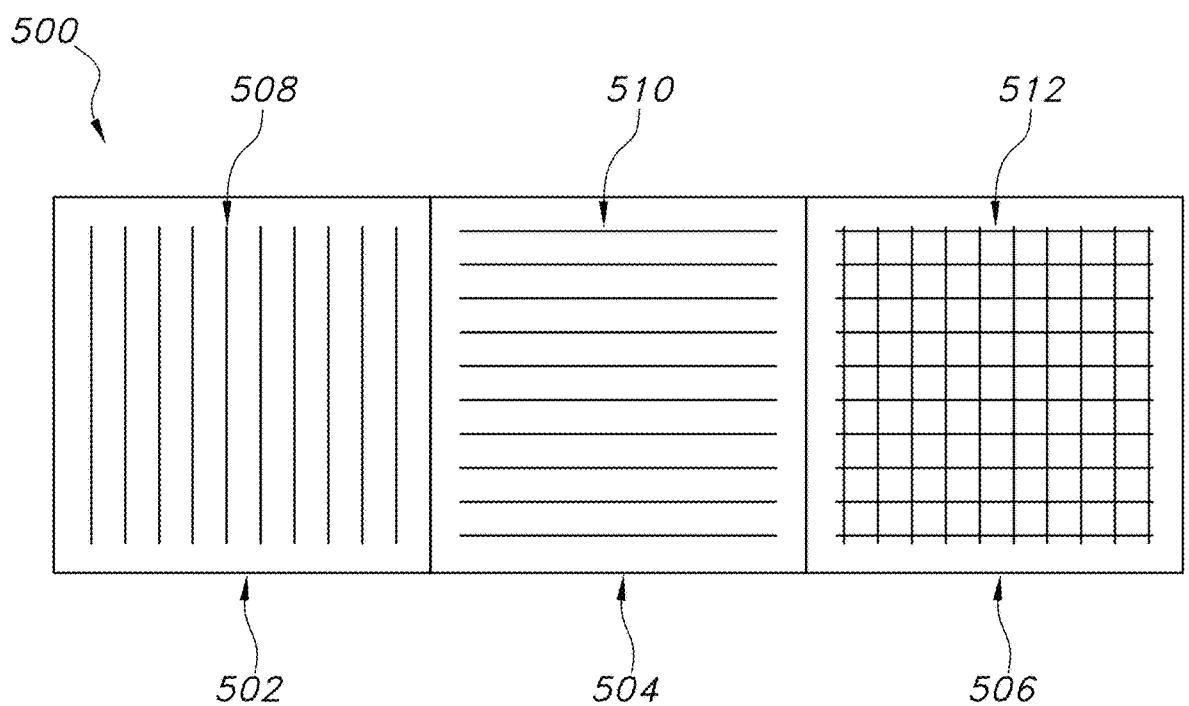
FIG. 7 shows a textile fabric comprising three segments, wherein each of the three segments are incorporated with a unique code pattern.

In some embodiments, the plurality of functional code patterns produced in the single textile fabric are identical. For instance, in FIG. 6, a textile fabric 400 comprises three segments 402, 404, and 406. Each of the three segments 402, 404, and 406 comprises an identical code pattern as shown as code patterns 408, 410, and 412 and as indicated by the vertical stripes visible on each of the three segments 402, 404, and 406. On the other hand, in some embodiments, the plurality of functional code patterns produced on a single textile fabric are different, such that a single textile fabric could be mass produced to comprise a functional code pattern comprising horizontal stripes in one segment of the textile material and a functional code pattern comprising a plaid design on a separate segment of the textile fabric. For example, in FIG. 7, a textile fabric 500 comprises three segments 502, 504, and 506. Each of the three segments 502, 504, and 506 comprises a unique code pattern 508, 510, and 512, as indicated by the vertical stripes in segment 502 corresponding to a unique code pattern 508, the horizontal stripes in segment 504 corresponding to a unique code pattern 510, and a plaid design in segment 506 corresponding to a unique code pattern 512. In all embodiments, the textile products produced contain functional code patterns that are readable by an appropriate electronic device.

In one embodiment, the method of producing such textile product can be accomplished using textile yarn materials that are not of equal diameter. The present application discloses a method used to calculate correction factors needed to compensate for the differences in textile yarn diameters, such that the established rules of barcode widths and spacing are respected. These correction factors can additionally be programmed in to the textile process machine, allowing for the compensation to be made at the instant the textile yarns are interlaced to create fabric.

Figure 3:
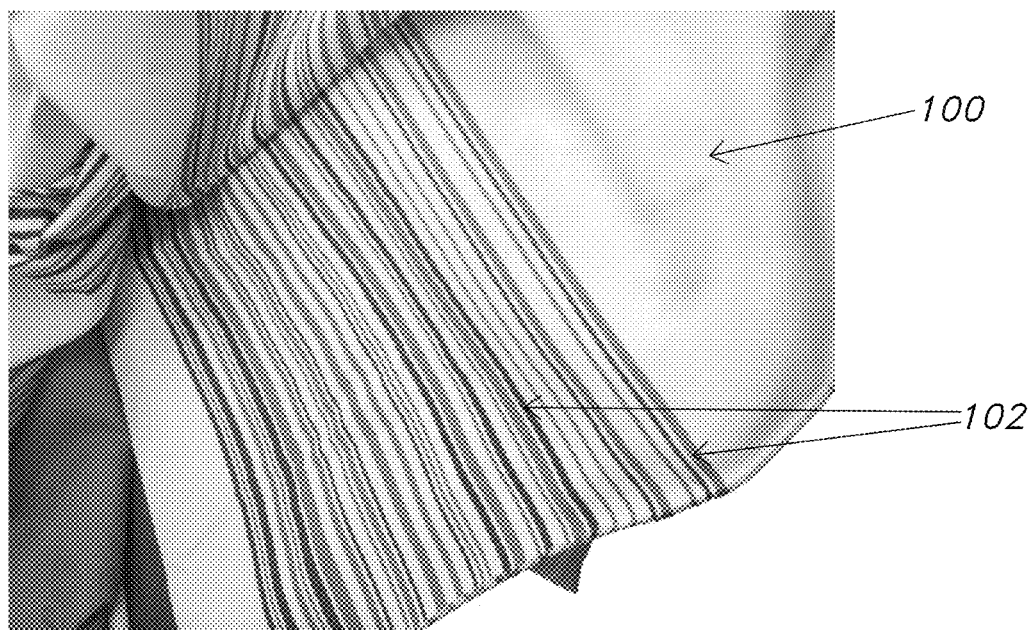
FIG. 3 shows an example of a piece of fabric embedded or alternatively digitally printed thereon with a functional, decorative, and readable code pattern indicated by the horizontal, striped pattern on the exterior of the fabric.
Figure 4:
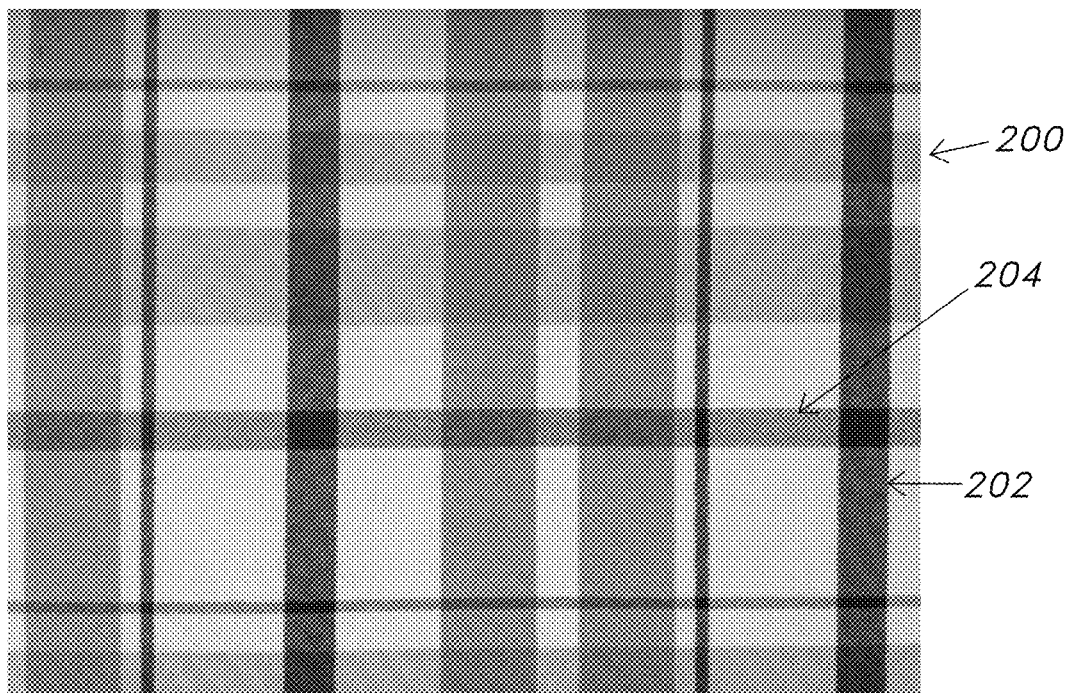
FIG. 4 shows an example of a piece of fabric entirely embedded or digitally printed with a functional and readable code pattern indicated by the plaid design.

The present application relates to functional code patterns produced in any pattern. Certain embodiments of the present invention include but are not limited to, a code pattern created using horizontal stripes and a code pattern created in both the horizontal and vertical directions on a textile material, resulting in a plaid design that is visually appealing yet functional. In FIG. 3, a fabric 100 embedded or digitally printed with a functional code pattern comprising visible horizontal stripes 102 with alternating colors is illustrated. When an electronic code reading device is used to read the code pattern depicted in FIG. 3, the triggered response includes an exclamatory statement (e.g., Go team!). In FIG. 4 a fabric 200 embedded with a visible plaid design including vertical stripes 202 and horizontal stripes 204 covering the entire fabric is illustrated.

The present application can be used to form functional code patterns on a variety of textile products, including but not limited to clothing garments, backpacks, blankets, and fabric sheets. In FIG. 5, a coat garment 300 embedded or digitally printed with a functional code pattern is illustrated. The functional code pattern consists of a multitude of horizontal stripes 302 that occupy a large portion of the visible exterior of the coat.

The following steps characterize the creation of a fabric that includes a readable barcode (e.g., functional code pattern) as contemplated by the present invention.

1. For each type of code format, there are public guidelines for bar widths and width combinations. For example, in Code 128 format, the letter "A" is denoted as "111323." This means that the letter "A" can be interpreted if the reading device sees 6 alternating black and white bar units that abide by the ratios "111323". (1 unit black followed by 1 unit white followed by 1 unit black followed by 3 units white followed by 2 units black followed by 3 units white.)
2. Code characters such as "111323" can be converted into specific quantities of textile threads placed in a garment or other product. The textile threads themselves become the bars in the functional code pattern based on one or more conversion factors to convert the bars to numbers of threads or yarns. In effect, this requires converting bar dimensions from a description on paper, into an exact quantity and spacing of textile yarns which comprise a fabric or other material product, while accounting for shrinkage in the warp or weft directions that is inherent in the process of forming a textile fabric. In addition, mathematical ratios can be used to increase the size of the traditional bar code to span an entire width of fabric over a predetermined length. For instance, in its simplest form, Code 128 character "A" can be converted to a readable textile fabric by building the fabric as 1 black thread followed by 1 white thread followed by 1 black thread followed by 3 white threads followed by 2 black threads followed by 3 white threads, where such thread counts correspond to the code "111323" sequence for the letter "A" in Code 128. This step can be referred to as calculating the conversion factor for a desired character or component of the bar code. Then, if it is desired to enlarge the formed textile barcode, for more visibility, then the thread quantity in each bar can be multiplied by the same factor (doubled, tripled, etc.), which will automatically preserve the bar width ratios for that character. This step can be referred to as calculating the appropriate mathematical ratio for to adjust a traditional bar code to a desired size based on the fabric being produced.

3. Multiple readable characters may be placed in the same textile product, to create an understandable message. The main stipulation is that published rules for the code format are followed, and threads that comprise the textile material are added in quantities that respect the ratios of the bar widths. With a combined string of characters incorporated into the textile fabric, it is possible to use any public-domain barcode reader (such as a smart phone app) to see and display the intended message.

In many cases, it may be desirable that each textile fabric in the form of a product or garment that includes a functional code pattern to be unique or customized, containing a code sequence that does not appear in any other garment or product. This allows a garment or product to be electronically assigned to a specific owner. To accomplish this characteristic, the textile fabric or material that goes into a single product must be changed or re-coded, per unit of product. In this case, the functional code pattern or barcode (which is part of the textile fabric itself) must be viewed as a unique serial number. For example, if a final textile product was made from 3 linear yards of woven fabric, barcode uniqueness would mean that the code used would need to change on a 3 yard basis. (The code would need to index to another value on a 3 yard increment, same as a serial number.) This becomes an unmanageable task if changing codes at 3 yard increments is performed manually, as this would require stopping the fabric formation process to allow reprogramming of the bar widths residing in the fabric. Thus, the present invention contemplates a continuous process for incorporating a plurality of functional code patterns onto a textile fabric without having to stop the fabric formation process each time a new functional code pattern is incorporated into the fabric.

Modern textile manufacturing equipment generally includes a high degree of computerization, and memory storage. Therefore, a fabric formation machine can be programmed to make a specific code pattern over a given length of material, then automatically index to a new code pattern. Typically, it would also be normal to separate each coded fabric section with a single strand of brightly colored textile yarn that serves as an obvious marker to delineate or indicate that a code change has been made.

In order to automatically produce unique sections of coded fabrics, the following sequence can be followed. In this example, the coded bars will be in the width direction, but could be placed in width direction, length direction, or a combination of the width and length directions depending on the desired functional code pattern to be incorporated into the textile fabric.

1. Establish the range of bar patterns to be used, in units of threads of each color such as black and white. The normal format used is referred to as ".des" files which can be created on a computer and then easily transferred to the fabric formation machine. In Code 128 format, the symbol "A" is denoted as "111323". If for example it was desired to make this symbol larger by a factor of 3, the sequence entered into the ".des" file would be 3 threads black, 3 threads white, 3 threads black, 9 threads white, 6 threads, black, 9 threads white. This sequence can be repeated automatically until the desired linear yardage is fully realized.

2. At the point where it is desired to index to the next code within the fabric, the machine can be instructed to add one thread (of a specific color) to serve as a dividing line between fabric sections.

3. The ".des" files mentioned in (1) above can be created to index or change slightly over a specific length. For example, "111323" can be indexed to "111324" and so forth. When these files are created in a long string and then loaded into the fabric formation machine memory, segments of the desired unique coded fabric are realized automatically.

While in one particular embodiment as described above, the functional code pattern is embedded within a textile during the fabric formation process, the use of high speed digital printing on fabric is an important alternative manufacturing method, particularly in terms of efficiency in mass-producing a plurality of functional code patterns on a sheet of textile. In this embodiment, fabric can be printed upon to produce a fabric containing a functional code pattern. Although the manufacturing method is different, the functional or aesthetic code pattern is still able to initiate a reaction when read by an electronic reading device. Further, digital printing provides the capability to incorporate functional code patterns into products that have already been manufactured in addition to sheets of fabrics or textiles. Further, digital printing is an efficient manner to incorporate patterns onto textile products. In one embodiment, a computer programs a textile process machine to effectively control bar width, bar spacing, and bar color of the code pattern produced such that the printing is readable by an electronic reading device.

Figure 8:
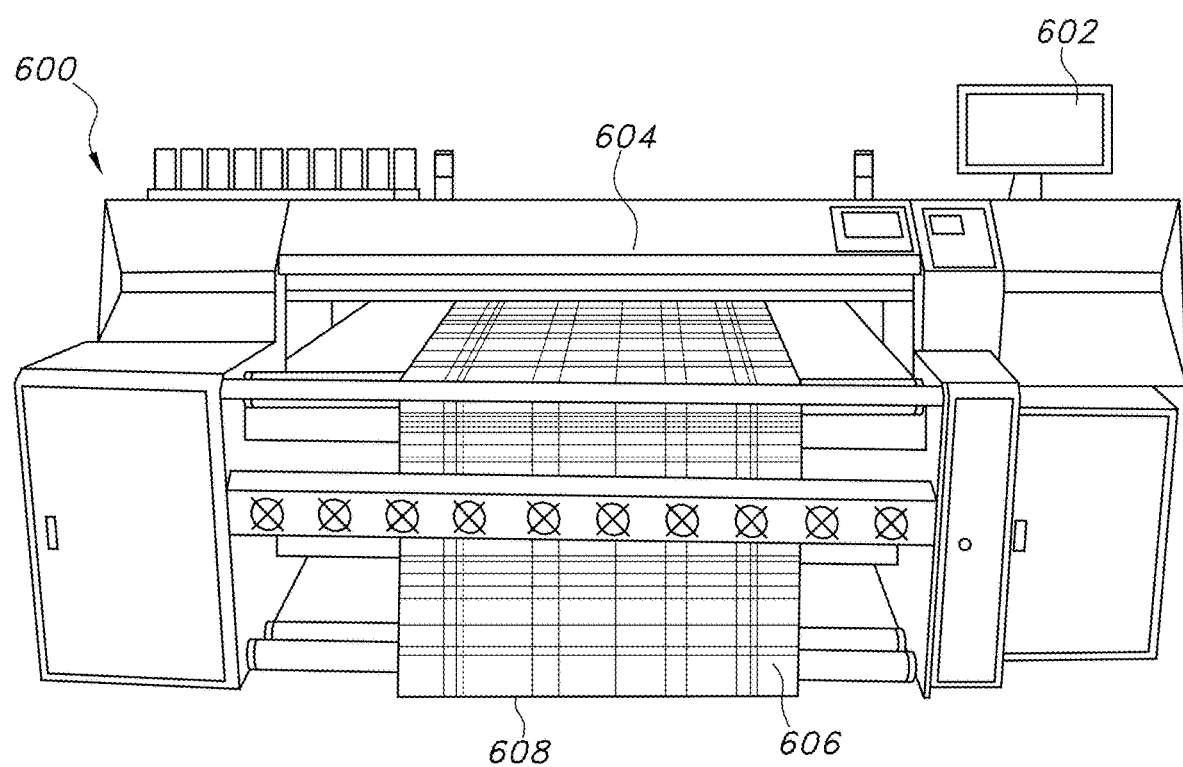
FIG. 8 shows a computer and textile product digital printing apparatus, wherein a functional code pattern is digitally printed onto a textile fabric.

The textile process machine then digitally prints the pattern directly onto a textile product. In FIG. 8, one example of a digital printer 600 is shown. A digital printer can produce a textile product having a functional code pattern printed thereon through programming comprising a computer controlled mechanism. A computer 602 can be used to electronically configure the desired parameter values, similar to the process of embedding the functional code pattern 606 in a textile product. The parameter values are then transmitted to the textile process machine 604, where the pattern is digitally printed directly onto a textile product. The code pattern 606 can be altered on demand through programming the computer 602 as desired, such that each final textile product 608 contains the desired functional code pattern 606.

The computer 602 calculates conversion factors to allow a digitally printed fabric to adhere to standard barcode formatting rules to transfer to the functional code pattern printed on the textile product and calculates mathematical ratios between dimensions of a standard barcode label and desired dimensions for the functional code pattern printed on the textile product, wherein the functional code pattern is enlarged compared to the standard barcode label. The computer 602 then programs a textile process machine 604 with the calculated conversion factors and mathematical ratios, wherein the programming controls bar width, bar spacing, bar color, or a combination thereof of the functional code pattern 606. Thereafter, the functional code pattern 606 is digitally printed onto the textile fabric 608.

In some embodiments, the printing results in a plurality of unique code patterns produced on the textile products, such that each individual final textile product contains its own unique functional code. In other embodiments, the programming results in identical code patterns produced on the textile products. In yet other embodiments, the programming results in a plurality of unique code patterns produced on the textile products.

The fabric can be digitally printed using processes known by one of skill in the art. For instance, an ink jet printer, a laser jet printer or any other suitable printer can be used. An inkjet printer emits ink from nozzles while they pass over the fabric or textile product. Inkjet printers can use thermal technology, whereby heat is used to fire ink onto the fabric. In one embodiment, a squirt of ink is initiated by heating the ink to create a bubble until pressure forces it to burst and hit the fabric. The bubble then collapses as the element cools, and the resulting vacuum draws ink from the reservoir to replace the ink that was ejected. Alternatively, a high pressure pump can direct liquid ink through a nozzle, creating a continuous stream of ink droplets. For laser printers, a desired pattern is sent from a computer to a laser printer where a negative charge is applied to a cylindrical drum by a primary charge roller. Then a laser etches the image onto the drum surface. The area struck by the laser has a more positive charge so that when negatively charged printer toner is transferred to the surface of the drum, it sticks to the areas marked by the laser and falls off the areas that remain negatively charged. Toner is then transferred from the surface of the drum to the fabric by a transfer roller that applies a positive charge to the fabric that attracts the negatively charged toner from the drum. Then the toner is fused to the fabric by a combination of heat and pressure.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalent thereto.

What is claimed is:

1. A method of producing a textile fabric comprising a functional code pattern embedded therein, the method comprising:
   calculating conversion factors for a barcode comprising bars to convert the bars to numbers of threads or yarns for the functional code pattern embedded within the textile product;
   calculating mathematical ratios between dimensions of the barcode and dimensions for the functional code pattern embedded within the textile product, wherein the functional code pattern is enlarged compared to the barcode;
   adjusting a number of threads or yarns for each bar of the enlarged functional code pattern for the textile product;
   programming a textile process machine, wherein the programming controls bar width, bar spacing, or a combination thereof of the functional code pattern; and
   simultaneously incorporating the functional code pattern into the textile fabric and interlacing a plurality of textile yarns to form the textile fabric, wherein the functional code pattern is visible to the human eye, wherein the functional code pattern spans an entire width of the textile fabric over a predetermined length of the textile fabric, and wherein the functional code pattern is programmable to allow a user to associate his or her own desired personalized response when the functional code pattern is read by an electronic code reading device.

2. A method as defined according to claim 1, wherein the method comprises mass producing the textile fabric by simultaneously incorporating a plurality of functional code patterns into the textile fabric, wherein the method of mass producing the textile fabric is a continuous process.

3. A method as defined in claim 2, wherein the textile fabric comprises a single textile base material comprising a plurality of unique functional code patterns.

4. A method as defined in claim 2, wherein the textile fabric comprises a single textile base material comprising a plurality of identical functional code patterns.

5. A method as defined in claim 1, wherein the textile process machine comprises a weaving machine or a knitting machine.

6. A method as defined in claim 1, wherein the functional code pattern is woven or knitted into the textile fabric.

7. A method as defined in claim 1, wherein the plurality of textile yarns are of varying diameters.

8. A method as defined in claim 7, wherein the textile process machine is programmed with determined correction factors prior to manufacture to compensate for differences in the varying diameters of the plurality of textile yarns.

9. A method as defined in claim 1, wherein the plurality of textile yarns have a consistent diameter.

10. A method as defined in claim 1, wherein the textile fabric comprises a plurality of segments, wherein the textile process machine is programmed to produce a unique functional code pattern for each of the plurality of segments.

11. A method as defined in claim 1, wherein the textile fabric comprises a plurality of segments, wherein the textile process machine is programmed to produce identical functional code patterns for each of the plurality of segments.

12. A method as defined in claim 1, wherein the functional code pattern is incorporated into the textile fabric via printing.

13. A method as defined in claim 1, wherein the functional code pattern is read by an electronic code reading device.

14. A method as defined in claim 1, wherein the functional code pattern extends in a vertical direction and a horizontal direction.

15. A method as defined in claim 14, wherein the functional code pattern comprises horizontal stripes, vertical stripes, or a plaid pattern.

16. A method as defined in claim 1, wherein the functional code pattern comprises a Code 39 barcode or a Code 128 barcode.

17. A method as defined in claim 1, wherein the functional code pattern includes a horizontal barcode component and a vertical barcode component.

18. A textile fabric formed according to the method of claim 1, wherein the textile fabric is constructed into any textile product composed of textile material.

19. A textile fabric as defined in claim 18, wherein the textile product comprises a garment, a backpack, a fabric, or a blanket.

* * * * *